2,946,005
HIGH FREQUENCY THERMOCOUPLE METER

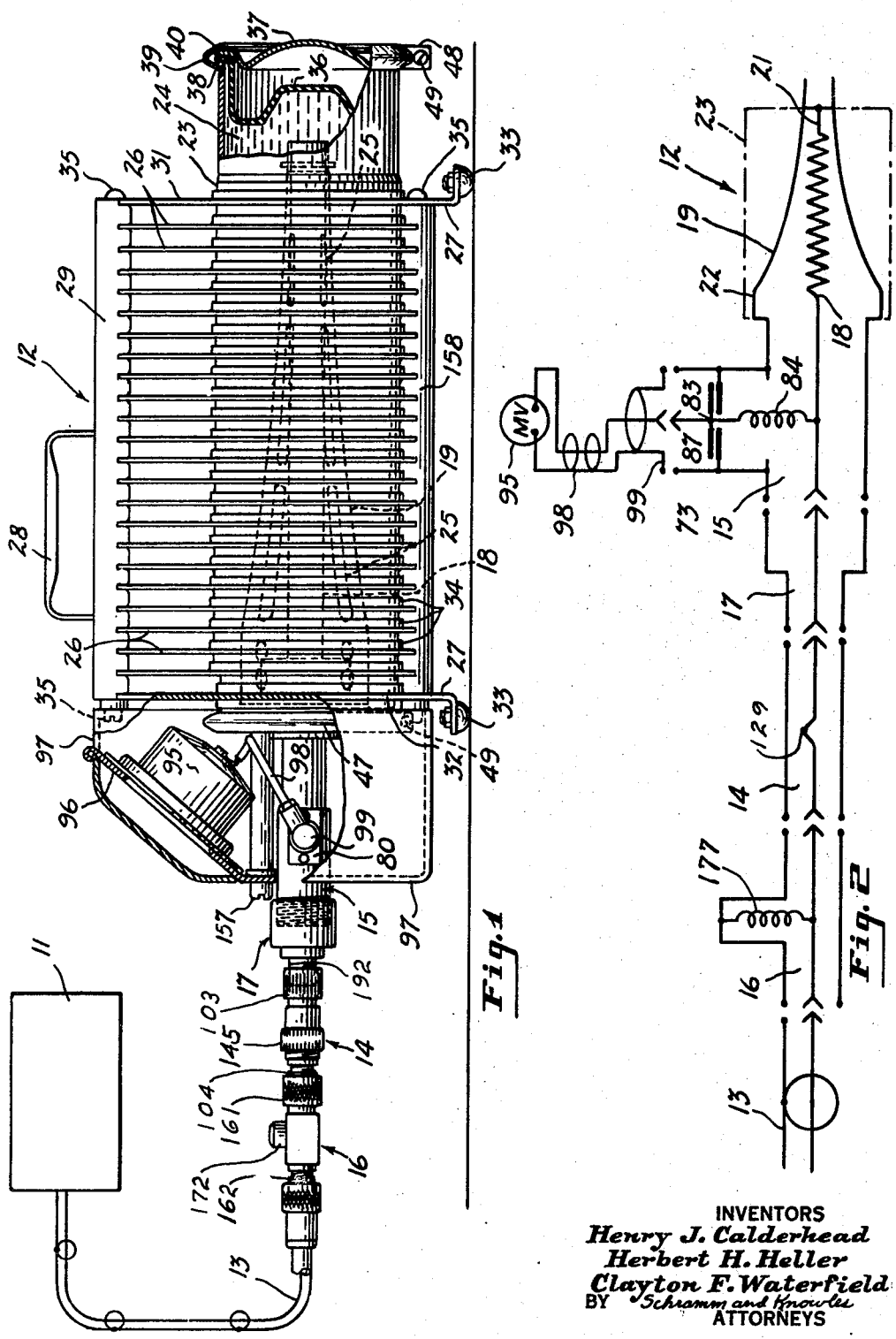
July 19, 1960 — C. F. WATERFIELD ET AL — 2,946,005
HIGH FREQUENCY THERMOCOUPLE METER
Filed Sept. 14, 1955 — 3 Sheets-Sheet 1
INVENTORS
Henry J. Calderhead
Herbert H. Heller
Clayton F. Waterfield
BY Schramm and Knowles
ATTORNEYS

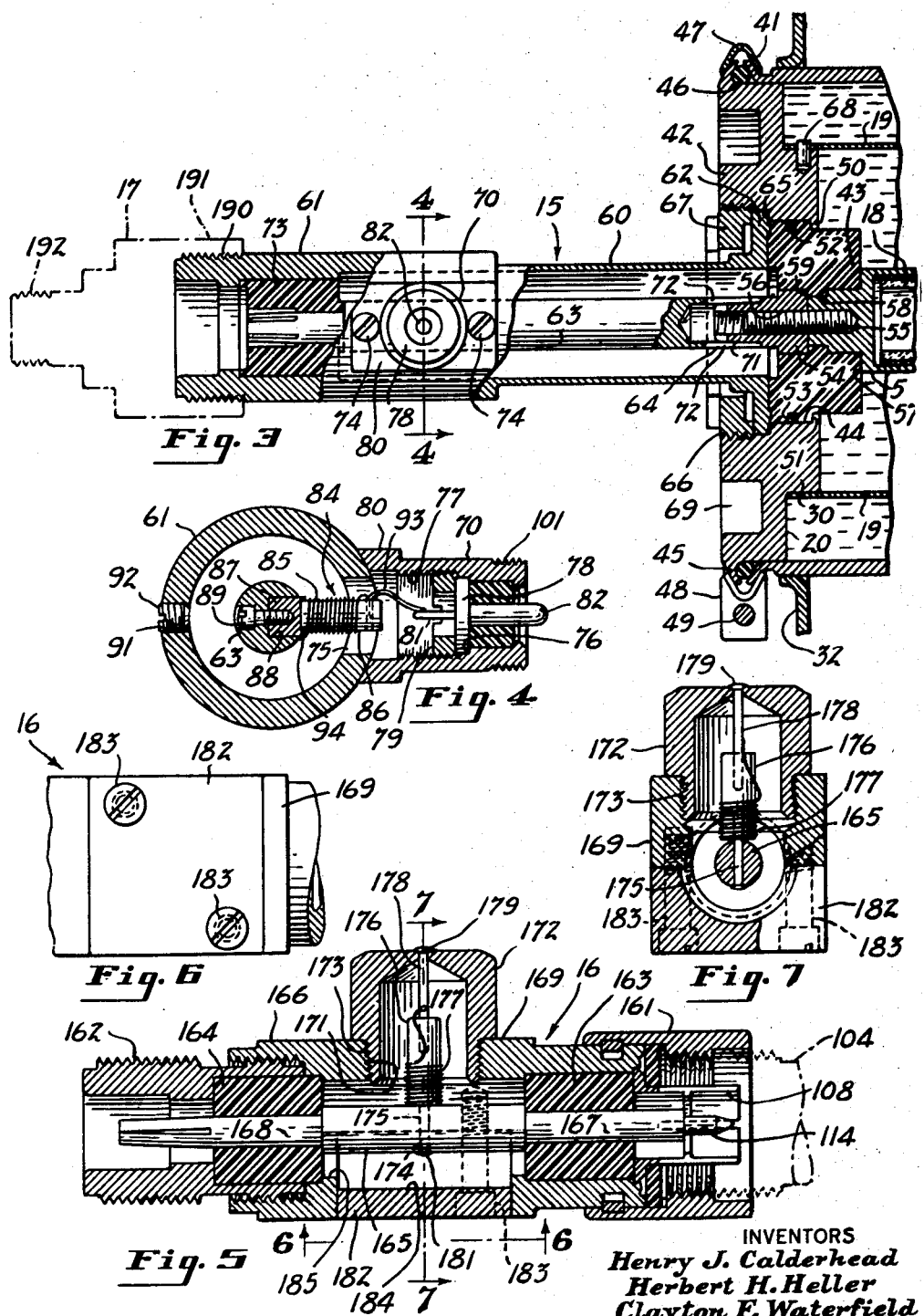

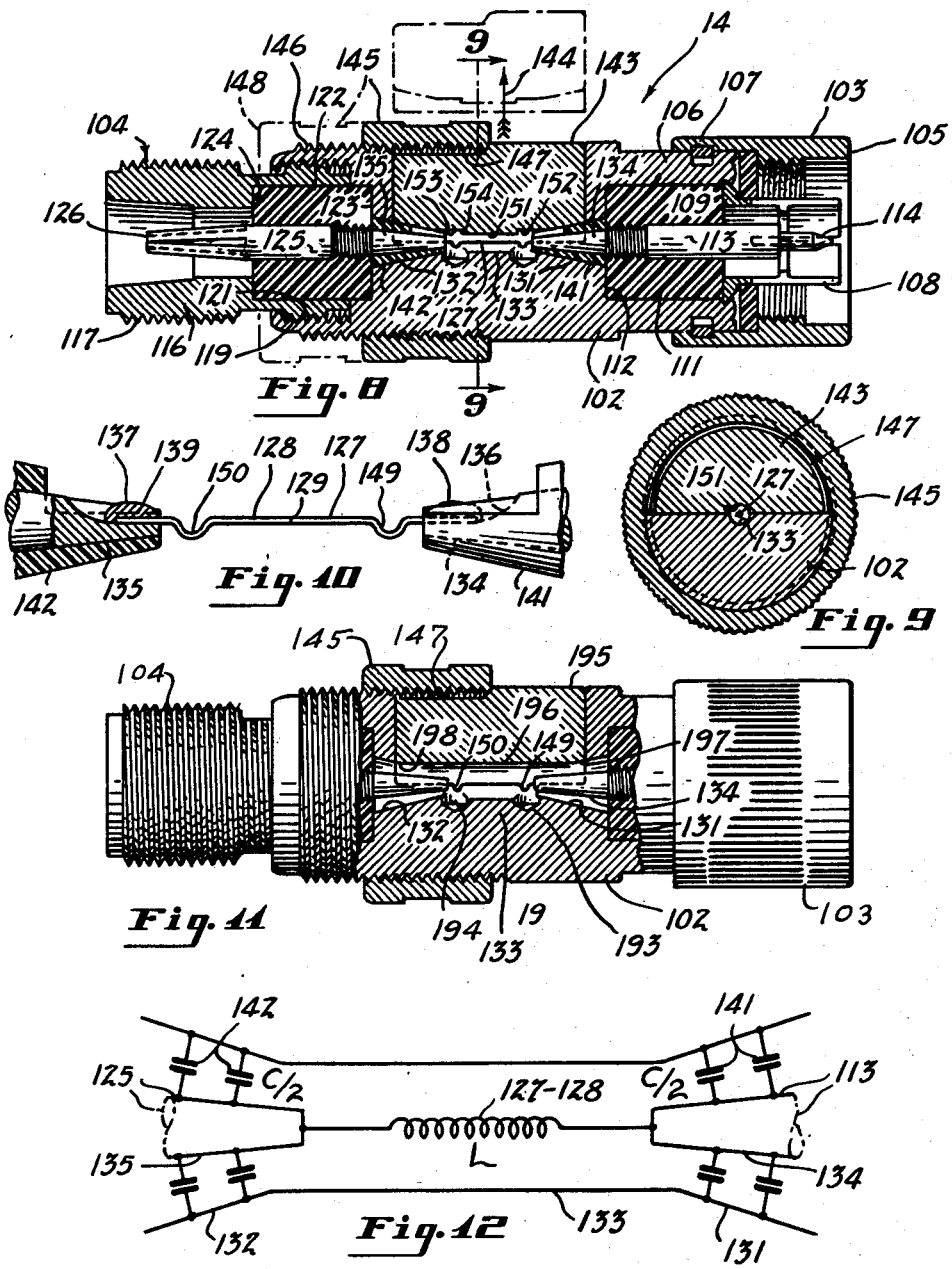

Clayton F. Waterfield, Cleveland, Henry J. Calderhead, Euclid, and Herbert H. Heller, Cleveland Heights, Ohio, assignors to The Bird Electronic Corporation, Cuyahoga County, Ohio, a corporation of Ohio Filed Sept. 14, 1955, Ser. No. 534,226

17 Claims. (Cl. 324—95)

This invention relates to radio frequency measurement and to apparatus for use in radio frequency systems and for testing.

An object of the invention is to provide improved radio-frequency absorption wattmeters and improved radio-frequency dummy loads.

In testing, tuning and otherwise adjusting high frequency radio transmitters and radio frequency generators, it is desirable to make power measurements and to absorb the power during such measurements to avoid interference and radiation; and in many cases also dummy loads for such transmitters and radio frequency generators are needed. For convenience of use in the field and avoidance of excessive burden of equipment, it is desirable that such wattmeters or dummy loads be versatile as to the range of power and frequency ratings.

Moreover convenient interchangeability of elements is a prerequisite to utilization of such equipment in the field as well as ruggedness, durability and reliability.

It is accordingly an object of the invention to provide improved radio frequency absorption wattmeters and improved radio frequency dummy loads which are usable or adaptable for a wide range of power consumptions and over a wide range of radio frequencies. Furthermore it is an object to provide such apparatus which is readily portable and will remain accurate for long periods of time when subjected to the requirements of use in the field.

A specific object of the invention is to provide for effective dissipation of energy in absorption wattmeters and dummy loads.

Another object is to provide improved cooling units for dummy loads and radio-frequency absorption wattmeter resistors.

A further object is to protect sensitive instruments from excessive temperatures or heating effects resulting from the dissipation of electrical energy in resistors and dummy loads.

Still another object is to provide improved joints between coaxial line measuring units and liquid cooling tanks for resistors and dummy loads.

A further object is to provide a direct-current measuring circuit in a load unit for capacity-coupled transmitters.

Still another object is the avoidance of errors from stray contact and thermal electromotive forces.

A further object is to enable thermocouple current and power measurements to be made in high frequency apparatus employing coaxial lines.

Moreover it is an object to minimize reflections and power losses in the measurement of high frequency power and to obtain a low standing wave ratio in coaxial line apparatus employing thermocouples.

Still another object is to compensate for variation in characteristic impedance of a coaxial line otherwise resulting from change in diameter ratios of inner and outer conductors when interposing a fine wire thermocouple in the center conductor.

Other and further objects, features and advantages of the invention will become apparent as the description proceeds.

In carrying out the invention in accordance with a preferred form thereof, a high frequency radio transmission line system is provided composed of a plurality of separate elements which may be connected together and may be connected to the output of a radio frequency generator or a high frequency radio transmitter.

The apparatus is designed for use with transmitters and generators operating in the radio frequency ranges where coaxial lines are employed. In order to avoid reflections and power losses, or inability to absorb the power of the transmitter, a terminating impedance is provided of the horn type having an outer conductor with a tapering inner diameter and a center conductor in the form of a resistor rod such that the characteristic impedance remains the same independent of variations in transmitter frequency.

In order that substantial amounts of power may be dissipated in testing transmitters up to 500 watts capacity for example, cooling means are provided for dissipating the energy of the terminating impedance. To this end a tank is provided filled with an electrically insulating or dielectric cooling fluid in which the terminating impedance is immersed. The center resistor rod is mounted therein having an impedance equal to the characteristic impedance of the coaxial line equipment utilized with the generator to be tested. This terminating resistor is surrounded by the tapering horn outer conductor within the tank. The tapering horn outer conductor is slotted or perforated so that the cooling liquid may reach the entire surface of the resistor freely and circulation of the liquid may take place. Preferably also cooling fins are provided on the outer walls of the tank for dissipating to the air the heat transmitted from the resistor to the cooling liquid.

A direct-current measuring unit is attached to the input end of the termination unit having a coaxial line fitting by means of which it may be connected to a transmitter or generator through coaxial line elements. The thermo-electric principle is employed for the measurement of power. In order to cause the radio frequency energy being measured to flow through a thermocouple, a thermocouple is employed which is in the form of a pair of aligned wires of dissimilar metals which are butt welded to form a thermo-junction. The straight wires forming a single straight conductor unit or thermocouple rod are interposed in the center conductor of a coaxial line unit to form a portion of the center conductor. A direct current millivoltmeter is provided for measuring the thermal voltage generated in the thermocouple by the passage of radio frequency current therethrough.

In order to provide a return path for the direct current of the millivoltmeter when the termination unit is capacity-coupled to generator or transmitter and to avoid long line IR drop when inductively coupled, which is often the case in the highest frequency ratings, a shunt choke element is interposed between the transmitter or generator and the coaxial line unit containing the thermocouple. The shunt choke serves also to eliminate from the direct-current measuring circuit any spurious voltages which might be caused by stray, contact or thermoelectromotive forces in the coaxial line connections or in the transmitter circuits.

A better understanding of the invention will be afforded by the following detailed description considered in conjunction with the accompanying drawings forming part of the specification and in which:

Fig. 1 is an elevation, partially broken away and in section, of an absorption type coaxial line wattmeter, schematically illustrating the manner of connection to a radio frequency generator or transmitter.

Fig. 2 is a circuit diagram of the power measuring system of Fig. 1 with some circuit elements represented schematically.

Fig. 3 is a fragmentary view, primarily in section, of the apparatus of Fig. 1 and Fig. 2 illustrating the direct-current instrument, coaxial line connecting unit and the joint between it and the absorption resistor and coolant tank.

Fig. 4 is a view of a cross section of the apparatus of Fig. 3 represented as cut by plane 4—4 indicated in Fig. 3.

Fig. 5 is a detail longitudinal sectional view of the coaxial shunt choke assembly for completing the direct-current measuring circuit and eliminating spurious voltages from the measuring circuit.

Fig. 6 is a fragmentary view of the apparatus of Fig. 5 illustrating the arrangement of a removable closure for a portion of the coaxial line unit of Fig. 5 to permit access to the interior thereof in order to complete the assembly.

Fig. 7 is a view of a cross section of the apparatus of Fig. 5 represented as cut by plane 7—7 indicated in Fig. 6.

Fig. 8 is a longitudinal section of the coaxial line thermocouple assembly unit employed in the apparatus of Figs. 1 and 2.

Fig. 9 is a view of a cross section of the apparatus of Fig. 8 represented as cut by plane 9—9 indicated in Fig. 8.

Fig. 10 is a detail of the butt joined rod type of thermocouple employed in the apparatus of Fig. 8, illustrating the manner in which it is mounted.

Fig. 11 is a longitudinal section of a modified form of coaxial line thermocouple unit, and Fig. 12 is an equivalent circuit diagram of the thermocouple connection in Fig. 8.

Like reference characters are utilized throughout the drawings to designate like parts.

As represented in Figs. 1 and 2, in measuring the power of a transmitter or radio frequency generator represented by a rectangle 11, a tapering horn type termination unit 12 is connected to the transmitter 11 through a coaxial line 13, which has interposed therein a thermocouple unit 14 and a direct-current measuring unit 15. Preferably also a shunt choke unit 16 is interposed in the coaxial line 13 between the transmitter 11 and the thermocouple unit 14. Moreover in order that the termination unit 12 may include coaxial line elements of sufficient size and diameter to dissipate the required power while permitting smaller diameters to be employed in the remaining coaxial line units, a transition element or adaptor 17 is interposed between the coaxial line thermocouple assembly unit 14 and the direct current measurement unit 15. The latter is preferably mounted in a unitary structure with the termination unit 12.

The termination unit 12 comprises a resistor rod 18 having the same resistance as the characteristic impedance of the coaxial line elements employed and a tapering horn outer conductor or resistor housing 19 tapering toward its small diameter or terminal end to substantially the diameter of the resistor rod 18, being electrically connected thereto at terminal or remote end 21 of such resistor rod. The resistor housing 19 has a diameter at the input end 22 such as to give with the resistor rod unit 18 a ratio of diameters conforming to that of the other coaxial line units so as to give the same characteristic impedance at the input end, namely 50 ohms in the case of the use of 50-ohm line elements. The resistor 18 and the tapered horn outer conductor 19 are mounted within a tank 23 containing a suitable insulating fluid and coolant 24 such as transformer oil, for example.

The outer conductor 19 is composed of a relatively thin shell of a high conductivity metal such as brass or copper, for example, and is provided with a plurality of vents, openings, or slots 25 to permit circulation of the transformer oil 24 to carry heat away from the resistor 18 by convection of thermosiphon action and transfer it to the walls of the tank 23. The tank 23 is likewise composed of a metal such as aluminum, brass or copper of good thermal conductivity. To accelerate the dissipation of heat from the walls of the tank 23, cooling fins 26 are secured thereto.

As shown in Fig. 1 and represented schematically in Fig. 2 the termination unit 12 in the tank 23 and the direct-current measuring unit 15 are mounted together as a single structural unit provided with feet 27 and a carrying handle 28 secured to a bar 29 which is in turn secured to each of the cooling fins 26.

Preferably the fins 26 include end fins or plates 31 and 32, somewhat heavier than the other fins 26 with the lower ends extended to form the feet 27, preferably bent over to receive resilient pads 33. As shown the tank 23 is in cylindrical form with the radiating fins 26 in substantially rectangular form having circular openings receiving the cylindrical tank 23. For securing the radiating fins 26 to the cylindrical walls of the tank 23 contact flanges 34 are formed on the fins 26 and fit closely against the surface of the tank 23 to provide good thermal conduction joints. If desired the joints may be brazed or soldered. The handle support bar 29 is secured to the plates 31 and 32 by suitable means such as screws 35.

In order to allow for expansion of the liquid coolant as it is heated by the dissipation of electrical energy in the resistor 18 a resilient diaphragm 36 of cup shape is provided as shown in Fig. 1 and a metallic protective cap 37 is also provided. The diaphragm 36 is composed of a suitable heat resistant, oil resistant, resilient material such as synthetic rubber, for example. In order to provide an oil tight joint between the edges of the diaphragm 36 and the tank 23, the end of the tank 23 is rolled outward to form a flange 38 and a V section clamping ring or band 39 is provided for pressing the peripheral edge 40 of the protective cap 37 and the edges of diaphragm 36 against the flange 38.

For closing the opposite end of the tank 23, the end toward the direct-current measuring unit 15 is also spun outward to form a flange 41 and a mounting ring or plug 42 is provided to fit therein, the present construction being a variation of that described and claimed in copending application for United States Patent Serial No. 460,042, filed Oct. 4, 1954, for Coaxial Line Load Device. An annular insulating window 43 is provided in a bore 44 of the ring 42. The ring 42 is provided with flange 45 turned toward the tank 23. A resilient ring gasket 46, circular in cross section, is provided to form an O-ring seal between the flanges 41 and 45. A V cross-section clamping ring or band 47 is provided for drawing the flanges 41 and 45 together and compressing the O-ring 46. The clamping bands 39 and 47 are provided with lugs 48 and contraction screws 49 for drawing the ends of each of the clamping bands 39 and 47 together.

The insulating window 43 is in the form of a bushing of suitable electrical insulating material resistant to high temperatures and effects of high frequency fields, such as polytetrafluoroethylene for example. In order to fix the axial position of the insulating bushing 43 in the bore 44 of the ring 42, the ring 42 is formed with an annular inwardly extending flange 50 and the bushing 43 is formed with a shoulder 51 adapted to bear against the flange 50. A liquid-tight seal is provided by a resilient deformable rubber O-ring 52 mounted in an annular groove 53 in the insulating bushing 43, the O-ring engaging and being compressed by the surrounding walls of the bore 44.

In order to bring out an electrical connection to the input end of the resistor rod 18, being the lefthand end of such rod as viewed in Fig. 1, such end of the rod is supportingly received in one end of a fitting 5 (Fig. 3). The other end of the fitting is snugly received in a central opening in the insulating bushing or window 43 and is secured in end to end coaxial relation as a by a screw 55.

The resistor rod 18, not shown in detail, may comprise an elongated cylindrical ceramic rod or tube having deposited or otherwise coated thereon a thin film of conductive material. The ends of the rod are treated with a metal conductive paint to form bands which extend onto the conductive surface film so that electrical connection can be made to the film through the conductive paint bands. The paint band on one or the righthand end of the resistor rod, as viewed in Fig. 1, is gripped by and thus connected both physically and electrically to the small diameter end of the outer conductor horn 19. The other end of the resistor rod is formed with a reduced diameter portion over which the conductive paint band may be extended and this reduced end portion is telescoped into the counterbored end of the metal fitting 5. The fitting 5 and the spud 54 are of conductive metal such as brass or copper and are formed as by turning in a lathe. The fitting 5 is reduced in diameter in two steps forming a shoulder 57 bearing against the inner face of the insulator bushing 43 and a shoulder 58 bearing against a corresponding shoulder formed in the insulator 43 which likewise has another annular shoulder 59 axially spaced from the shoulder 58 and against the spud 54 is adapted to bear, whereby the spud 54 and the rod 18 are definitely located axially in respect to the insulator bushing 43 and securement of the bushing 43 serves to locate the resistor fitting 5 and the resistor rod 18 axially in the termination unit 12.

The coaxial line measuring unit 15 includes an outer tubular conductor 61 having on one end a flange 62 and an inner conductor 63 having a hollow slotted end portion 64. The mounting ring 42 is provided with a radial shoulder 65 and an internally threaded counterbore 66 of greater diameter than its bore 44 to receive an annular clamping screw 67 adapted to clamp the inclined marginal surface portion of the flange 62 of the outer conductor 61 of unit 15 against the annular edge corner on the shoulder 65 in the mounting ring 42 and compressively against the outer face of the insulator bushing 43. The periphery of the radial flange 62 is offset axially in the provision of an annular land having the inclined or frusto-conical surface that makes line contact with the edge corner of the shoulder 65. Thus is obtained good electrical contact at the diameter of the bore 44 in the mounting ring 42. Additionally, the axial offset of the flange periphery provides an annular sharp corner step concentric to the flange periphery and the axis of the device, which step bites into the annular insulator bushing 43 and effects a mechanical interlock and an annular high pressure line contact that serves as a secondary seal augmenting the seal obtained by the O-ring 52. The arrangement and combination of parts associated with the bushing 43 thus provides a construction whereby the bushing 43 is located within the bore of the plug 42 and the resistor rod 18 of the unit 12 is likewise axially located. In this manner electrical connection is made between the outer conductor 61 and the mounting ring 42, which is in turn electrically connected to the larger diameter end 22 of conductor 19 of the termination unit 12. The latter preferably fits around and is secured to a neck portion 30 of the ring 42 and against a shoulder 20 by a plurality of screws 68.

An annular cavity 69 is cut in the face of the mounting ring 42 for better cooling and weight reduction. The outer surface of the outer end 71 of the spud 54 is tapered and the end 64 of the center conductor rod 63 is provided with slots 72 to form spring fingers gripping the surfaces of the tapered end 71 of the spud 54, whereby electrical contact is made between the center conductor rod 63 and the screw 55. It will be observed that the stepping down of the rod 18 at the shoulders 57 and 58, and the stepping of the effective internal diameter of the outer conductor 19 at the bore 44 of the mounting ring 42 and the diameter reduction effected by the flange 62 serve to provide the requisite transition from the unit 12 to the unit 15 to maintain substantially constant diameter ratios and avoid reflection effects.

As illustrated in Fig. 3 the wall thickness of the outer conductor 61 of the unit 15 is very considerably reduced at the end portion 60 toward the flange 62 and the termination unit 12 whereby the heat conductivity of the outer conductor 61 at the end 60 toward the termination unit 12 is greatly reduced to minimize the flow of heat from the unit 12 toward the portion of the unit 15 carrying the direct current circuit elements.

Although, for convenience in the drawing the outer conductor 61, the thin wall tubing portion 60 and flange 62 are shown as integral, the invention is not limited thereto and in practice are more economically fabricated separately and assembled. The thin wall section is preferably stainless steel for low thermal conductance and mechanical strength.

An insulator bushing 73 is provided for a supporting and centering the left hand end of the inner conductor rod 63 of the unit 15. As illustrated in Figs. 3 and 4, a lateral direct-current connector unit 70 is secured to the central portion of the outer surface of the outer conductor 61 of the unit 15 by means of screws 74. A lateral opening 75 is provided in the outer conductor 61. The connector unit 70 is in the form of metal tube with a flange or base 80 suitably shaped to conform to the outer surface of the conductor 61 and receive the fastening screws 74, and having a bore with a shoulder 76 and an internally threaded portion 77 of greater diameter, whereby an annular through-type condenser 78 may be secured against the shoulder 76 by means of an annular screw 79. The through type condenser 78 is of a conventional type well known to those skilled in the art in which the periphery consists of one terminal and the center consists of a second terminal having an opening adapted to receive a connection pin 81.

In the apparatus illustrated, the connection 81 is formed integrally with a larger diameter, pin portion 82 serving as a center conductor cooperating with the tubular portion 70 to form a direct-current connector. The pin 81—82 is soldered or otherwise secured to the center terminal 83 (schematically represented in Fig. 2) of the condenser 78 in the conventional manner.

For eliminating radio frequency current from the direct-current circuit a radio frequency choke 84 is provided consisting of a coil of wire 85 wound upon a suitable insulating form 86, supported by a plug 87 fitting a suitable socket or bore hole 88 in the center conductor 63. For securing the plug 87 in the slot 88, a suitable fillister screw 89 is provided. For access to the screw 89 for assembly purposes an opening 91 is provided in the outer conductor 61 adapted to be closed by a screw 92. A lead 93 is provided electrically connected by soldering or otherwise to the inner end of the pin 81 and the outer end of the choke wire 85. The inner end of the choke wire coil in turn is electrically connected by soldering or the like at 94 to the inner conductor 63.

A direct current millivoltmeter 95 is provided which is mounted in a suitable oblique mounting plate 96 in a metal frame 97 suitably secured by means of fastener studs 157 or the like to the termination unit 12. The fastener studs 157 are screwed at one end to the frame 97 and at the other to the plate 32 and fins 26 which are joined by the spacing rib 29 and the lower spacing ribs 158. The millivoltmeter 95 is provided with a shielded cable 98 having a connector unit 99 at the end adapted to mate the direct-current connector fitting consisting of the pin 82 and the tube 70 externally threaded as shown at 101 in Fig. 4, the connections being represented schematically in Fig. 2.

As illustrated in Fig. 8 the coaxial line thermocouple unit 14 comprises an outer conductor body 102 with coaxial line fittings 103 and 104 at the ends to mate with conventional internally and externally threaded coaxial line fittings of companion units. The end fitting 103 includes a coupling nut 105 secured to the end 106 of the outer conductor 102 by means of a spring ring 107 cooperating with annular grooves in the members 103 and 106. There is a tubular contact 108 with a conical base 109 secured to the end 106 of the outer conductor 102 by spinning the edge over the conical base 109. An insulator bushing 111 is secured in the outer conductor 102 between a shoulder 112 and the flange formed by the conical base 109. The bushing in turn supports a pin 113 threaded therein and having a reduced diameter end portion with a conical tip 114. At the opposite end of the outer conductor 102 to form the connector 104 there is a tubular member 116 with external threaded portions 117 and 119, the latter serving to secure the member 116 in a threaded bore 121 formed in the outer conductor 102. There is an insulator bushing 122 supported between a shoulder 123 in the outer conductor 102 and a flange 124 in the member 116. The tubular bushing 122 supports a pin 125 threaded therein and having spring fingers 126 at the outer end thereof.

The pins 113 and 125 serve as the end portions of a center conductor cooperating with the outer conductor 102 to form a coaxial line unit. The central portion of the center conductor, as illustrated in greater detail in Fig. 10, consists of a thermocouple rod formed by joining the tips of two wires or rods 127 and 128 of dissimilar metals to form a thermo junction 129. The junction may be accomplished by welding. The wires 127 and 128 as shown are straight except for expansion loops or crimps 149 and 150 which may be provided to avoid buckling when heated. The straight portions of the wires 127 and 128, are in alignment along the axis of the outer conductor body 102.

The diameters of the rods or wires 127 and 128 depend upon the heat to be dissipated, which in turn depends upon the power rating of the unit. Accordingly interchangeable thermo-couple units with different rod diameters are provided for different power ranges of the apparatus. For any power range, however, a relatively small diameter of thermocouple rod is required in order to raise the temperature of the thermo junction 129 sufficiently above the cold junctions in the slots 136 and 137 to produce a thermo-electric voltage of sufficient magnitude for measurement by the millivoltmeter 95. Accordingly the center portion of the inner conductor of the thermocouple unit 14 is of relatively small diameter and to maintain an appropriate ratio of the inner diameter of the outer conductor to the diameter of the inner conductor it is necessary to make the inner diameter of the central portion of the outer conductor unit 102 relatively small. Accordingly as shown the reduction in diameter is accomplished by the shoulders 112 and 123 illustrated, and further reduction takes place along tapered throats 131 and 132 to a relatively small internal diameter at the portion 133. The center conductor pins 113 and 125 are also tapered at inwardly extending portions 134 and 135 as more clearly illustrated in Fig. 10. The tips of the tapering portions 134 and 135 are provided with slots 136 and 137 respectively, adapted to receive the ends of the dissimilar metal rods 127 and 128, respectively. Electrical connection is made by globules of solder 138 and 139.

Owing to the fact that it is impracticable to reduce the internal diameter of the portion 133 of the outer conductor 102 which surrounds the thermocouple wires sufficiently to maintain the same diameter ratio as in other portions of the concentric line system, compensating effects are introduced at the tapers 131 and 132 to match the other portions of the concentric line system to the usually much higher—often as much as 2 to 1—characteristic impedance produced within the mid-portion 133 of the outer conductor 102.

This compensation is accomplished by introducing tapering conical dielectric or insulator bushings 141 and 142 in the space between the center pin tapers 134 and 135 and the outer conductor tapers 131 and 132. The dielectric bushings 141 and 142 are of a suitable plastic such as polytetrafluoroethylene or, preferably, one of the more heat resistant plastic insulating materials known as Rexolite 1422 of Hysol and available commercially. These insulators have dielectric constants of from about $e=2$ to about $e=4$. Other insulators having dielectric constants suited to the particular requirements of the section being corrected, may be used. The insulators must have high breakdown strength when subject to electrical pressure and heat so as to avoid electric flashover. The dielectric constant of the insulators is several times that of air or of the gas with which the line may be filled so as to have the effect of introducing shunt distributed capacity at the ends of the thermocouple wires, which reduces the characteristic impedance. It will be observed that the outer diameter of the conical dielectric bushings 141 and 142 tapers at a greater rate than the inner diameter so that the radial thickness of the dielectric bushings 141 and 142 also tapers to a smaller magnitude toward the center of the unit 14 and a tapering transition effect is accomplished.

In the frequency range from 20–1400 megacycles, where the apparatus is designed to operate, the fine wire thermocouple 127—128 tends to act as a series connected inductance as illustrated schematically in Fig. 12, and with the by-pass condenser effect introduced by the dielectric bushings 141 and 142 tends to act as a low-pass filter having a cut-off frequency well above the operating range of the wattmeter.

The arrangement of Fig. 12 will be recognized as a $\pi$ section operating in the passband where:

$$-1 < \frac{X_L}{4X_C} < 0$$

$X_L$ is the inductive reactance of inductance L of the thermocouple wires 127, 128; $X_C$ is the total capacitive reactance of all the effective capacitance represented at 141 and 142, assuming the distributed circular effective capacitances at the opposite ends of the thermocouple wires to be equal to one another so that capacitance $C/2$ is located at each end of the thermocouple wire inductance L. To obtain the benefits of the invention, however, it is not necessary that the effective capacitances be exactly equal at the two ends of the inductance wires. Correction of the undesirable impedance characteristics introduced by the fine thermocouple wires is effected, though somewhat less efficiently, by capacitors (distributed capacitances) 141 and 142 that are not equal. Utilization of the dielectric bushings 141 and 142 avoids high voltage flashover which would result if the clearance between the tapered tips 134, 135 and the throats 131, 132 were made small enough to achieve high capacity effect by mere proximity of confronting surfaces. In the preferred structure the distance between the shoulders 112 and 123 is less than 2.5 centimeters so that even at 2400 megacycles the overall length of the thermocouple 127—128 and the parallel condensers at the dielectric bushings is less than a quarter wave.

In order to permit assembly of the thermocouple rods 127 and 128 with the center conductors 134 and 135 the outer conductor 102 is formed with a removable cover block or saddle plug 143 which may be removed by moving it in the direction of the arrow 144 to the position shown in broken lines of Fig. 8. The removable block is substantially semi-cylindrical in extent and has radial end faces slidingly received against spaced parallel confronting faces of the body opening in which the block is disposed in assembly. For securing the cover-block 143 in the assembled position shown in full lines in Fig. 8, an internally threaded sleeve or retaining nut 145 is provided, adapted to mate with an external thread 146 on the outer conductor body 102. The substantially semi-cylindrical cover-block 143 is formed with a neck portion 147 of somewhat reduced diameter to correspond to the internally threaded diameter of the sleeve 145, whereby the cover-block 143 may be secured in position by screwing the sleeve 145 from the position 148 shown in broken lines to the assembled position shown in full lines in Fig. 8.

As illustrated in Fig. 8 the cover-block 143 is provided internally with a portion having a concave semi-cylindrical surface 151 of less radius than the adjacent portions 152 and 153 which are also of semi-cylindrical shape. In this manner the effective ratio of outer to inner conductor diameter is kept down along the surface 151 in order to avoid unduly increasing the characteristic impedance of this section of the line. However, increasing the radius of the inner surfaces 152 and 153, avoids danger of short circuiting the line.

The shunt choke unit 16, illustrated in greater detail in Fig. 5, is provided with coaxial line connection fittings 161 and 162, similar to the fittings 103 and 104 described in connection with Fig. 8, and corresponding insulating bushings 163 and 164 supporting and locating a center conductor 165 within an outer conductor 166. The center conductor 165 is provided with reduced diameter portions 167 and 168 corresponding to the pins 113 and 125 of Fig. 8 with respect to the coaxial line units.

The central portion 169 of the outer conductor 166 is formed with a square outer surface instead of cylindrical and a lateral opening 171 is provided therein which is internally threaded to receive a cap 172 having an externally threaded neck portion 173. The center conductor 165 has a transverse bore 174 for receiving a conductive metal pin 175 supporting an insulating winding form 176 carrying a choke coil 177, which is in turn further supported by a conductive metal pin 178 extending through the cap 172 and secured therein at 179 by a globule of solder. The outer end of the coil 177 is electrically connected, e.g., by soldering to the pin 178 so as to make an electrical connection through the globule of solder 179 and the cap 172 to the outer conductor 166. Likewise the inner end of the coil 177 is electrically connected, e.g., by soldering to the center conductor 165 or to the inner pin 175. In this manner the coil 177 forms a shunt choke between the inner and outer conductors of the concentric line system. It may comprise about 30 to about 40, usually about 36, turns of #39 (.0035 inch) ga. copper wire on a 5/32 inch diameter insulating core. The inductance is so high as to have no effect on high frequency currents. However, spurious direct current voltages from stray contact or thermal effects in the line 13 and transmitter 11 are by-passed and do not affect the millivoltmeter 95.

In order to provide access to the opposite side of the center conductor 165, for securing the end 181 of the pin 175 in the bore 174 as by a globule of solder, a portion of the outer conductor 166 is provided with a removable section or plug 182 adapted to be secured in place by a pair of cap screws 183.

The removable conductor saddle section 182 constitutes a segment of the outer conductor of the line, here shown as a substantially semi-circular segment. Its radial end faces slidingly engage the parallel confronting radial faces of the body opening or slot in which the saddle is received. While the curvature of internal semi-cylindrical conductive surface 184 of the removable section 182 normally may be of the same radius as the cylindrical bore 185 of the outer conductor 166, it is feasible, by increasing the radius of the cylindrically curved surface 184, as shown, to adjust the impedance of the central part of the shunt or D.C. return path unit 16. Although the radius of the cylindrically curved surface 184 of the section 182 is shown to be greater than the radius of the internal bore 185 which constitutes the central part of the outer conductor of the unit, it is intended, of course, that the removable section 182 will be formed with a curved surface of such larger or smaller radius as will obtain the desired impedance at and through the central part of the unit 16. The radius of curvature of the surface 184 of the removable saddle section 185 may be conveniently determined empirically by testing the unit 16 having a saddle section 182 with an internal surface 184 of relatively small radius (giving low impedance to the line) and using conventional impedance measuring techniques and instruments. To increase the impedance so as to correct the line characteristics the radius of curvature of the section is increased by milling, filing, or drilling alternated with repeated testing until the desired impedance is obtained. Alternatively a number of the removable sections 182 may be provided, each with a different radius of curvature for its internal surface 184. The different sections are tried out one at a time using conventional impedance measuring techniques and instruments to select the particular section which obtains the best matching of the unit 16 to the transmission line. Once so determined, the radius of curvature of the conductive internal surface 184 of the removable saddle block 182 is fixed for production.

In assembling the coolant tank and termination unit 12 of Fig. 1 the fins 26 and the end plates 31 and 32 are first secured to the cylindrical tank then the tapering horn outer conductor 19 is secured to the mounting ring 42 by means of the screws 68 and the resistor rod 18 is pushed into place and assembled with the insulating window 43. The outer conductor 61, previously assembled with its inner conductor 63, may then be assembled with the ring 42 and secured by means of the annular screw 67 in order to seal the joint in the bore 44 in the sealing ring 42. Thereafter the ring 42 may be assembled with the cylindrical tank 23, sealed and secured by means of the O-ring 46 and the clamping band 47. Thereafter the unit may be up-ended to fill the tank with the insulating coolant such as transformer oil 24, whereupon the expansion diaphragm 36 and the cap 37 are sealed and secured by means of the clamping band 39. When the flange 62 of the direct-current measuring unit 15 is assembled with the mounting ring 42, the slotted end 64 of the center conductor 63 is pushed over the tapered end 71 of the spud 54.

The thermocouple unit 14 is assembled by inserting the tapered insulator bushings 141 and 142 and the tubular insulators 111 and 122. The center rods 113 and 125 may have been assembled with the insulators 111, 122, 141 and 142 beforehand or the rods 113 and 125 may be screwed in the insulators 111 and 122 subsequently. The base 109 of the tubular contact 108, is secured in the end of the outer conductor body 102 by spinning over the end. The thermocouple wire unit 127—128 is soldered in place with the cover-block 143 removed, which is thereafter assembled in place.

The shunt choke unit 16 is likewise assembled by first inserting the center conductor 165 and pushing the tubular insulators 163 and 164 in place after which the flanges for holding the tubular insulators 163 and 164 are secured. Thereafter the pin 175 for mounting the coil 177 is inserted. With the removable section 182 removed, the end 181 of the pin 175 is secured. The core 176 and the coil 177 are placed and the pin 178 is then inserted. The ends of the coil 177 are soldered to the pin 178 and the center conductor 165, the cap 172 is screwed in place and the outer end of the pin 178 is electrically and mechanically connected by the solder globule 179.

In assembling the thermocouple unit 14 with the direct-current measuring unit 15, the transition unit 17 is inserted, which may be of conventional form having an internally threaded larger diameter portion or socket 191 for mating with the externally threaded end 190 of the outer conductor 61 of the unit 15 and an externally threaded smaller diameter portion 192 for mating with the coaxial line fitting 103 of the thermocouple unit 14.

Fitting 162 of the shunt choke unit 17 is coupled with the coaxial line 13 as by an internally threaded sleeve in conventional manner.

In utilizing the measuring system illustrated in Figs. 1 and 2, a thermocouple unit 15 is selected having a power capacity equal to or exceeding the anticipated output of the transmitter or radio frequency generator 11. For example a plurality of different units may be employed designed for different power ratings from 15 watts to 400 watts, which are interchangeable in the system so that the system as a whole is adaptable for measurement of power over a wide range. The construction as illustrated for use in 50-ohm characteristic-impedance coaxial line equipment is likewise useful over a wide range of frequencies from 20 megacycles to 1400 megacycles, for example.

In Fig. 8 the cover block or plate 143 is shown with internal semi-cylindrical reliefs 152 and 153 which are axially short relative to the central portion 151 and compensate for impedance irregularities and discontinuities introduced into the line by the expansion loops 149 and 150 of the thermocouple wires. These reliefs also prevent arcing between the outer conductor and the shoulders formed by the kinks or bends 149, 150 of the thermocouple wires. As a still further variation of the structure to accommodate the loops 149, 150 and to avoid arcing and compensate for irregularities in the impedance of the line introduced by such loops, the body block 102 is formed with pits 193 and 194 (seen to advantage in Fig. 11) located opposite and in the same transverse radial planes as the wire kinks or loops 149 and 150, respectively. The pits 193 and 194 may be formed as by drilling, the axes of the pits being parallel to one another and normal to the axis of the line unit 14.

In Fig. 11 is shown a modified arrangement wherein the semi-cylindrical reliefs 152 and 153 are omitted, a cover block 195 (otherwise like the cover block 143 previously described) being formed with an internal semi-cylindrical surface 196 the ends of which are flared, as shown at 197 and 198. The flared ends of the internal surface of the cover block blend into and are flush with the frusto conical surfaces 131 and 132 of the body block 195. In the modification of Fig. 11 the tapered dielectric bushings corresponding to the insulator bushings 131 and 132 have been omitted for clarity, it being understood that the insulator bushings are likewise employed in the Fig. 11 arrangement to correct the electrical characteristics of the line section in the manner described above.

Although the cover or saddle blocks 143, 182 and 195 are referred to as semi-cylindrical, it is convenient to make them in pairs as by sawing a previously drilled block in half axially, each block being then less than 180° in extent by an amount equivalent to the width of the saw kerf. In such case the companion body part is greater than 180° in extent by an equivalent amount.

The formation of the reliefs in the cover block 143 or 195 (either the semi-cylindrical reliefs 152, 153 or the tapered reliefs 197, 198) permits empirical adjustment of the impedance since the cover block can be readily removed to increase or decrease the depths, sizes or areas of such reliefs. In such adjustment of the impedance the removal of metal from the cover block has the effect of decreasing the capacitance of the section and thus also increasing the impedance.

In accordance with the patent statutes the principles of the present invention may be utilized in various ways, numerous modifications and alterations being contemplated, substitution of parts and changes in construction being resorted to as desired, it being understood that the embodiments shown in the drawings are given merely for purposes of explanation and illustration without intending to limit the scope of the claims to the specific details disclosed.

What we claim and desire to secure by Letters Patent of the United States is:

1. A radio frequency measuring system comprising in combination a coaxial line unit having a shunt choke and inner and outer conductors to which the shunt choke is connected for connection to a radio frequency generator, a coaxial line thermocouple unit comprising an outer conductor, an inner conductor including a pair of butted wires of dissimilar metals forming a thermojunction where they abut each other, said thermocouple unit being coupled to the inner and outer conductors of the shunt choke unit, a direct-current measuring unit comprising inner and outer conductors coupled to the inner and outer conductors of the thermocouple unit, a lateral direct-current millivoltmeter fitting having inner and outer conductors, the outer conductor being connected to the outer conductor of the direct-current measuring unit, a choke coil connecting the inner conductors of the millivoltmeter fitting and the direct-current measuring unit, a through type annular condenser connected between the inner and outer conductors of the millivoltmeter fitting, a termination unit comprising an outer conductor tapering from a larger diameter at an input end to a smaller diameter at a terminal end, connected at the input end to the outer conductor of the direct-current measuring unit and a resistor rod connected between the terminal end of the outer conductor and the inner conductor of the direct-current measuring unit.

2. A termination unit for a coaxial line radio-frequency system having inner and outer conductors, said unit comprising a mounting ring having a circular shoulder and a flange extending beyond the shoulder, a resistor housing of electrically conductive material fitting around and secured to such shoulder, a resistor in said housing, a resilient ring fitting against said flange for enabling said mounting ring to make a liquid tight joint with a tank for immersion of the resistor housing, said mounting ring being composed of electrically conductive material and having a coaxial opening therein with an inwardly extending flange and a counter bore, an insulating bushing having a shoulder adapted to fit against said flange and fitting within the bore in said mounting ring, said bushing having an annular groove in its periphery, a resilient ring within said groove for sealing said insulating bushing in said bore, said bushing having a bore and an electrically conducting spud within said bore for making electrical connection with the terminating resistor whereby the outer conductor of the coaxial line system may be received in said counter bore and the inner conductor of the coaxial line system may be brought in contact with said spud for making electrical connections to the resistor housing, and the resistor connecting spud respectively while retaining a liquid tight joint with the termination unit.

3. In an absorption type radio frequency measuring system, a unitary measuring and absorption device comprising in combination a coolant tank having cooling fins assembled therewith, a millivoltmeter mounting frame secured to said tank-fin assembly having an opening coaxial with the tank for receiving a coaxial-line direct-current measurement unit and having a mounting opening for a millivoltmeter, said tank having an end toward the millivoltmeter mounting frame with a mounting ring of electrically conductive material therein having an insulating window, a conductor spud in such insulating window, a resistor housing of electrically conducting material in said tank, connected to said mounting ring, a resistor rod in said tank electrically connected between said spud and said resistor housing, a coaxial line unit protruding through said millivoltmeter-frame coaxial opening, comprising an outer conductor with a threaded outer protruding end for connection to a coaxial line fitting and an inner end electrically connected to said mounting ring, an inner coaxial conductor with an inner end electrically connected to said conductor spud and a laterally extending direct-current connector with electrical connections to the inner and outer conductors, a millivoltmeter mounted in said frame mounting opening with a pair of terminals and a cable connecting said terminals to said lateral direct-current connector.

4. A coaxial line type thermocouple unit for power measurement in high frequency circuits at frequencies within a predetermined range, compensated for the impedance introduced by a thin thermocouple wire, comprising in combination an outer conductor body with a longitudinal coaxial bore, pins mounted in ends of said bore coaxially therewith, insulated from the outer conductor body, having tips extending inward toward each other tapering to progressively smaller diameter toward the inner ends of said tips, a thermocouple element comprising butted wires of dissimilar metals connected at one end to one of said pin tips and connected at the other end to the other of said pin tips, said coaxial bore having a minimum diameter around the thermocouple element and flaring to increased diameter around the tapering pin tips, the flaring portions of said bore having a greater taper than the pin tips, and truncated conical dielectric bushings mounted within the resultant spaces between said flaring portions of the bore and the tapering pin tips for introducing parallel capacity axially beyond the ends of the thermocouple element, the overall length of the unit measured to the ends of the dielectric bushings being less than a quarter wave length at the greatest frequency for which the apparatus is designed to operate.

5. A thermocouple unit for power measurement in a coaxial transmission line of a radio frequency circuit, said unit comprising an outer conductor in the form of a tubular conductive body defining a longitudinally extending through passage of generally circular section having axially spaced portions of relatively large cross sectional area and a portion of relatively small cross sectional area intermediate the large area portions, tubular insulators mounted in axially spaced relation in the large area portions of the through passage, said intermediate small area passage portion comprising a central section having the smallest cross sectional area along the length of the passage and tapered connecting sections extending between the central section and the large area portions of the passage, an inner conductor comprising conductive pins supported in the insulators and having tapered inner end portions directed toward one another and extending into the tapered sections of the through passage from the large area portions, the inner ends of the pins being axially spaced from one another, the tapered end portions of the pins being coaxial to the walls of the tapered sections of the passage and being separated therefrom by annular dielectric spaces which progressively decrease in cross sectional area from the large area passage portions toward the central section, a thermocouple element comprising abutted wires of dissimilar metals connected to and supported between the spaced inner ends of the pins, the characteristic impedance of the unit along each of the connecting sections being less than that of the transmission line for which the unit is designed to provide the effect of lumped capacitive reactances across the conductors of the unit, and the length of the intermediate passage portion being less than one quarter wavelength over the entire frequency range of the unit.

6. A thermocouple unit for power measurement in a coaxial transmission line of a radio frequency circuit, said unit comprising an outer conductor in the form of a tubular conductive body defining a longitudinally extending through passage of generally circular section having axially spaced portions of relatively large cross sectional area and a portion of relatively small cross sectional area intermediate the large area portions, tubular insulators mounted in axially spaced relation in the large area portions of the through passage, said intermediate small area passage portion comprising a central section having the smallest cross sectional area along the length of the passage and connecting sections extending between the central section and the large area portions of the passage, an inner conductor comprising conductive pins supported in the insulators and having inner end portions directed toward one another and extending into the connecting sections of the passage from the large area portions, the inner ends of the pins being axially spaced from one another, the pins being coaxial to the respective connection sections of the passage and being separated from the walls of such connecting passage sections by annular dielectric spaces, a thermocouple element comprising abutted wires of dissimilar metals connected to and supported between the spaced inner ends of the pins, the characteristic impedance of the unit along each of the connecting sections being less than that of the transmission line for which the unit is designed to provide the effect of lumped capacitive reactances across the conductors of the unit, and the length of the intermediate passage portion being less than one quarter wavelength over the entire frequency range of this unit.

7. A thermocouple unit for power measurement in a coaxial transmission line of a radio frequency circuit, said unit comprising an outer conductor in the form of a tubular conductive body defining a longitudinally extending through passage of generally circular section having axially spaced portions of relatively large cross sectional area and a portion of relatively small cross sectional area intermediate the large area portions, tubular insulators mounted in axially spaced relation in the large area portions of the through passage, said intermediate small area passage portion comprising a central section having the smallest cross sectional area along the length of the passage and connecting sections extending between the central section and the large area portions of the passage, an inner conductor comprising conductive pins supported in the insulators and having inner end portions directed toward one another and extending into the connecting sections of the passage from the large area portions, the inner ends of the pins being axially spaced from one another, the pins being coaxial to the respective connecting sections of the passage and being separated from the walls of such connecting passage sections by annular dielectric spaces, insulator bushings of material having a dielectric constant several times that of air disposed in the annular spaces surrounding the end portions of the pins, a thermocouple element comprising abutted wires of dissimilar metals connected to and supported between the spaced inner ends of the pins, the characteristic impedance of the unit along each of the connecting sections being less than that of the transmission line for which the unit is designed to provide the effect of lumped capacitive reactances across the conductors of the unit, and the length of the intermediate passage portion being less than one quarter wavelength over the entire frequency range of the unit.

8. A thermocouple unit for power measurement in a coaxial transmission line of a radio frequency circuit, said unit comprising an outer conductor in the form of a tubular conductive body defining a longitudinally extending through passage of generally circular section having axially spaced portions of relatively large cross sectional area and a portion of relatively small cross sectional area intermediate the large area portions, tubular insulators mounted in axially spaced relation in the large area portions of the through passage, said intermediate small area passage portion comprising a central section having the smallest cross sectional area along the length of the passage and connecting sections extending between the central section and the large area portions of the passage, an inner conductor comprising conductive pins supported in the insulators and having inner end portions directed toward one another and extending into the connecting sections of the passage from the large area portions, the inner ends of the pins being axially spaced from one another, the pins being coaxial to the respective connecting sections of the passage and being separated from the walls of such connecting passage sections by annular dielectric spaces, a thermocouple element comprising abutted wires of dissimilar metals connected to and supported between the spaced inner ends of the pins, one of the thermocouple wires being formed with a crimp to accommodate axial expansion and contraction of the thermocouple, the wall of the central section of the small area passage portion being relieved adjacent the wire crimp to provide clearance for the latter, the characteristic impedance of the unit along each of the connecting sections being less than that of the transmission line for which the unit is designed to provide the effect of lumped capacitive reactances across the conductors of the unit, and the length of the intermediate passage portion being less than one quater wavelength over the entire frequency range of the unit.

9. A thermocouple unit for power measurement in a coaxial transmission line of a radio frequency circuit, said unit comprising an outer conductor in the form of a tubular conductive body defining a longitudinally extending through passage of generally circular section having axially spaced portions of relatively large cross sectional area and a portion of relatively small cross sectional area intermediate the large area portions, said intermediate small area passage portion comprising a central section having the smallest cross sectional area along the length of the passage and tapered connecting sections extending between the central section and the large area portions of the passage, an inner conductor comprising conductive pins having tapered inner end portions directed toward one another, means supporting the pins with their tapered portions extending into the tapered sections of the through passage from the large area portions, the inner ends of the pins being axially spaced from one another, the tapered end portions of the pins being coaxial to the walls of the tapered sections of the passage and being separated therefrom by annular dielectric spaces which progressively decrease in cross sectional area from the large area passage portions toward the central section, truncated conical insulator bushings of material having a dielectric constant several times that of air disposed in the annular dielectric spaces surrounding the end portions of the pins, a thermocouple element comprising abutted wires of dissimilar metals connected to and supported between the spaced inner ends of the pins, the characteristic impedance of the unit along each of the connecting sections being less than that of the transmission line for which the unit is designed to provide the effect of lumped capacitive reactances across the conductors of the unit, and the length of the intermediate passage portion being less than one quarter wavelength over the entire frequency range of the unit.

10. In a termination unit for an absorption type radio frequency power measuring system or the like having a reflectionless termination comprising an inner resistive conductor and an outer thin metal conductor arranged as a coaxial line, a fluid tight tank formed with an opening for receiving said termination and containing a liquid dielectric coolant, an annular mounting ring having a central through passage, said ring being disposed across the tank opening and having an outer periphery secured to the tank in sealed relation, one end of the outer conductor being interfitted with and supported by the ring, the central through passage of the ring comprising a series of stepped diameter portions providing a pair of axially spaced locating shoulders extending circumferentially about the opening and a central cylindrical sealing surface extending axially between such shoulders, the through passage including a portion adjacent one of said shoulders of larger diameter than the sealing surface and defined by a cylindrical locating surface of the ring, a coaxial line connector assembly disposed as a continuation of the termination, such assembly comprising an outer tubular conductor having at one end a radially outwardly directed annular flange formed with a circular periphery received in the large diameter portion of the ring passage and slidingly engaged by the cylindrical locating surface, a center conductor extending longitudinally through the tubular outer conductor, an annular insulator of deformable material having an outer periphery of circular section comprising a cylindrical portion closely embraced by the sealing surface in the ring passage and a reduced diameter portion projecting into the tank, the insulator being formed with a radial circumferentially extending locating shoulder at the juncture of the cylindrical and reduced diameter peripheral portions, said insulator shoulder being disposed against the other of said pair of ring shoulders, a clamping ring threadedly engaging the mounting ring and adapted to be screwed against the annular flange on the outer conductor to force such flange against said one locating shoulder, the insulator having one end face disposed for engagement by the outer conductor flange over the major portion of the projected area of the insulator and being dimensioned to force the insulator shoulder against said other ring shoulder as the conductor flange is forced against said one ring shoulder, the insulator having a circular sectioned center passage of greater axial length than diameter and an integral annular flange projecting radially into such passage intermediate and spaced axially from both ends of the passage, a pair of conductive fittings extending into the insulator passage from opposite ends and engaged against opposite sides of the integral insulator flange, means for progressively drawing said conductive fittings together and holding them clamped against the said insulator flange in the provision of fluid tight seals between the insulator and such fittings, said fittings being electrically and physically connected one to the inner resistive conductor of the termination and the other to one end of the center conductor, said other fitting being formed with a radial shoulder engaged against the other end face of the insulator about one end of the center passage, and insulating means supporting the other end of the center conductor within and coaxial to the other end of the tubular outer conductor.

11. In a termination unit for an absorption type radio frequency power measuring system or the like having a reflectionless termination comprising an inner resistive conductor and an outer thin metal conductor arranged as a coaxial line, a fluid tight tank formed with an opening for receiving said termination and containing a liquid dielectric coolant, an annular mounting ring having a central through passage, said ring being disposed across the tank opening and having an outer periphery secured to the tank in sealed relation, one end of the outer conductor being interfitted with and supported by the ring, the central through passage of the ring comprising a series of stepped diameter portions providing a pair of axially spaced locating shoulders extending circumferentially about the opening and a central cylindrical sealing surface extending axially between such shoulders, the through passage including a portion adjacent one of said shoulders of larger diameter than the sealing surface and defined by a cylindrical locating surface of the ring, a coaxial line connector assembly disposed as a continuation of the termination, such assembly comprising an outer tubular conductor having at one end a radially outwardly directed annular flange formed with a circular periphery received in the large diameter portion of the ring passage and slidingly engaged by the cylindrical locating surface, a center conductor extending longitudinally through the tubular outer conductor, an annular insulator of deformable material having an outer periphery of circular section comprising a cylindrical portion closely embraced by the sealing surface in the ring passage and a reduced diameter portion projecting into the tank, the insulator being formed with a radial circumferentially extending locating shoulder at the juncture of the cylindrical and reduced diameter peripheral portions, said insulator shoulder being disposed against the other of said pair of ring shoulders, a clamping ring threadedly engaging the mounting ring and adopted to be screwed against the annular flange on the outer conductor to force such flange against said one locating shoulder, the insulator having one end face disposed for engagement by the outer conductor flange over the major portion of the projected area of the insulator and being dimensioned to force the insulator shoulder against said other ring shoulder as the conductor flange is forced against said one ring shoulder, the cylindrical portion of the insulator outer periphery being formed with an annular channel, an O-ring of resilient deformable material having greater elasticity than the insulator disposed in said channel, said O-ring being sealingly engaged against the cylindrical sealing surface of the ring to provide a fluid seal between the ring and the insulator, the insulator having a circular sectioned center passage of greater axial length than diameter and an integral annular flange projecting radially into such passage intermediate and spaced axially from both ends of the passage, a pair of conductive fittings extending into the insulator passage from opposite ends and engaged against opposite sides of the integral insulator flange, means for progressively drawing said conductive fittings together and holding them clamped against the said insulator flange in the provision of fluid tight seals between the insulator and such fittings, said fittings being electrically and physically connected one to the inner resistive conductor of the termination and the other to one end of the center conductor, said other fitting being formed with a radial shoulder engaged against the other end face of the insulator about one end of the center passage, and insulating means supporting the other end of the center conductor within and coaxial to the other end of the tubular outer conductor.

12. In a termination unit for an absorption type radio frequency power measuring system or the like having a reflectionless termination comprising an inner resistive conductor and an outer thin metal conductor arranged as a coaxial line, a fluid tight tank formed with an opening for receiving said termination and containing a liquid dielectric coolant, said tank opening comprising a cylindrical surface, an annular mounting ring having a central through passage and a cylindrical outer periphery slidingly engaged in the tank opening, means securing the mounting ring to the tank and effecting an annular fluid tight seal at the outer periphery of the ring, said ring having a cylindrical surface concentric to and smaller in diameter than said outer periphery, one end of the outer conductor being telescopically interfitted with such surface of the ring, the central through passage of the ring comprising a series of stepped diameter portions providing a pair of axially spaced locating shoulders extending circumferentially about the opening and a central cylindrical sealing surface extending axially between such shoulders, the through passage including a portion adjacent one of said shoulders of larger diameter than the sealing surface and defined by a cylindrical locating surface of the ring, a coaxial line connector assembly disposed as a continuation of the termination, such assembly comprising an outer tubular conductor having at one end a radially outwardly directed annular flange formed with a circular periphery received in the large diameter portion of the ring passage and slidingly engaged by the cylindical locating surface, a center conductor extending longitudinally through the tubular outer conductor, an annular insulator of deformable material having an outer periphery of circular section comprising a cylindrical portion closely embraced by the sealing surface in the ring passage and a reduced diameter portion projecting into the tank, the insulator being formed with a radial circumferentially extending locating shoulder at the juncture of the cylindrical and reduced diameter peripheral portions, said insulator shoulder being disposed against the other of said pair of ring shoulders, a clamping ring threadedly engaging the mounting ring and adapted to be screwed against the annular flange on the outer conductor to force such flange against said one locating shoulder, the insulator having one end face disposed for engagement by the outer conductor flange over the major portion of the projected area of the insulator and being dimensioned to force the insulator shoulder against said other ring shoulder as the conductor flange is forced against said one ring shoulder, the cylindrical portion of the insulator outer periphery being formed with an annular channel, an O-ring of resilient deformable material having greater elasticity than the insulator disposed in said channel, said O-ring being sealingly engaged against the cylindrical sealing surface of the ring to provide a fluid seal between the ring and the insulator, the insulator having a circular sectioned center passage of greater axial length than diameter and an integral annular flange projecting radially into such passage intermediate and spaced axially from both ends of the passage, a pair of conductive fittings extending into the insulator passage from opposite ends and engaged against opposite sides of the integral insulator flange, means for progressively drawing said conductive fitting together and holding them clamped against the said insulator flange in the provision of fluid tight seals between the insulator and such fittings, said fittings being electrically and physically connected one to the inner resistive conductor of the termination and the other to one end of the center conductor, said other fitting being formed with a radial shoulder engaged against the other end face of the insulator about one end of the center passage, and insulating means supporting the other end of the center conductor within and coaxial to the other end of the tubular outer conductor.

13. A coaxial line unit for series connection in a coaxial transmission line, said unit comprising in combination a tubular body providing an outer conductor defining a longitudinally extending passage of generally circular section, tubular insulators mounted in axially spaced relation in the passage, an inner conductor extending longitudinally in the passage and supported by the insulators, said body being formed with a lateral opening into a central portion of the passage intermediate the insulators, a conductive cover block fitting the lateral opening, the block having a cylindrically curved internal surface concentric to the axis of the unit and contoured to define a portion of an annular dielectric space surrounding the inner conductor, the block and the body being formed with shoulders engageable with one another to locate the internal surface of the block in predetermined relation to the inner conductor, a retainer nut threadedly engaging the body for movement axially of the body between a lock position embracing the block and the body and a release position axially displaced along the body from the lock position for removal of the block from the lateral opening in the body, the nut and the block being formed with coacting cam surface means arranged to bias the block radially against the body shoulders in movement of the nut to the lock position.

14. A coaxial line unit for series connection in a coaxial transmission line, said unit comprising in combination a tubular body providing an outer conductor defining a longitudinally extending passage of generally circular section, tubular insulators mounted in axially spaced relation in the passage, an inner conductor extending longitudinally in the passage and supported by the insulators, said body being formed with a lateral opening into a central portion of the passage intermediate the insulators, a conductive cover block fitting the lateral opening, the block having a cylindrically curved internal surface concentric to the axis of the unit and contoured to define a portion of an annular dielectric space surrounding the inner conductor, the block and the body being formed with shoulders engageable with one another to locate the internal surface of the block in predetermined relation to the inner conductor, a retainer nut threadedly engaging the body for movement axially of the body between a lock position embracing the block and the body and a release position axially displaced along the body from the lock position for removal of the block from the lateral opening in the body, the nut and the block each being formed with a circumferentially extending shoulder, and one such shoulder being inclined to the axis of the device and engageable with the other when the nut is screwed toward said lock position to cam the block and body together.

15. A coaxial line unit for series connection in a coaxial transmission line, said unit comprising in combination a tubular body providing an outer conductor defining a longitudinally extending passage of generally circular section, tubular insulators mounted in axially spaced relation in the passage, an inner conductor extending longitudinally in the passage and supported by the insulators, said body being formed with a lateral opening into a central portion of the passage intermediate the insulators, a conductive cover block fitting the lateral opening, the block having a cylindrically curved internal surface concentric to the axis of the unit and contoured to define a portion of an annular dielectric space surrounding the inner conductor, the block and the body being formed with shoulders engageable with one another to locate the internal surface of the block in predetermined relation to the inner conductor, a retainer nut threadedly engaging the body for movement axially of the body between a lock position embracing the block and the body and a release position axially displaced along the body from the lock position for removal of the block from the lateral opening in the body, the block being formed with an external circumferential shoulder substantially midway between its ends, and the nut being formed with a circumferential shoulder engageable against the block shoulder in the lock position of the nut to bias the block against the body upon tightening the nut.

16. A coaxial line unit for series connection in a coaxial transmission line, said unit comprising in combnation an outer tubular conductor having a lateral opening, a center conductor, means mounting the center conductor within and in coaxial relation to the outer conductor, the conductors being separated by an annular dielectric space, hollow cap means having a mouth closing the lateral opening and having a transverse wall spaced radially of the unit from such opening, the cap means having an internal chamber continuous with the annular dielectric space, a radio-frequency choke electrically connected between said cap means and the center conductor, said radio-frequency choke comprising a winding form of insulating material, coaxial conductive pins engaged in opposite ends of the form, the pins being electrically and physically united one to the center conductor, another to the cap means and constituting the sole support means for the winding form, a coil wound on the form, the coil being located in the dielectric space, and the ends of the coil being electrically connected to said one and said other pins.

17. A coaxial line unit for series connection in a transmission line, said unit including an outer conductor comprising a tubular body formed with a lateral opening intermediate and spaced from each of its ends, an inner conductor extending longitudinally through the body, the outer conductor also comprising a conductive cover block fitting the opening, the body and the block having internal walls defining a dielectric space extending longitudinally through the unit and surrounding the inner conductor, tubular insulators mounted in the body and disposed in the dielectric space in axially spaced relation, the inner conductor extending through and being supported by the insulators, the body having axially spaced substantially radial confronting surfaces defining the ends of the lateral opening, the block having oppositely directed substantially radial end surfaces disposed against the radial body surfaces in axially spaced abutment planes and being located thereby against axial shifting relative to the body, the internal walls of the body and the block being arcuately curved transversely of the line unit and defining surfaces having common lines of intersection with the abutment planes, the dielectric space including a central portion of relatively small cross sectional area located between points spaced axially inwardly toward one another from the abutment planes and, continuous with said central portion, transition portions each of generally larger cross sectional area than the central portion, said transition portions of the dielectric space extending through the abutment planes from said inwardly spaced points to points spaced axially away from one another beyond such planes, the internal wall of the block having a central portion of relatively small curvature radius relatively close to the longitudinal axis of the unit and partially defining said central portion of the dielectric space and having end portions of relatively large curvature radius more widely spaced from such axis than the central wall portion and partially defining said transition portions of the dielectric space, one of the conductors having a form in the region between the insulators introducing an irregularity in the impedance characteristics of the unit relative to those of a transmission line with which the unit is intended for use, the radius of curvature of such central portion of the internal wall of the block differing from the radius of curvature of the body wall defining the central portion of the dielectric space by an amount sufficient to compensate for the irregularity introduced and thereby correct the impedance of the unit to correspond to the impedance of the transmission line to which it is intended to connect the unit, and means securing the block in the lateral opening of the body.

References Cited in the file of this patent

UNITED STATES PATENTS

| | | |
|---|---|---|
| 1,959,191 | Acly | May 15, 1934 |
| 2,411,553 | Ramo | Nov. 26, 1946 |
| 2,423,506 | Landon | July 8, 1947 |
| 2,424,596 | Webber | July 29, 1947 |
| 2,497,706 | Wetherill | Feb. 14, 1950 |
| 2,526,399 | Okress et al. | Oct. 17, 1950 |
| 2,620,396 | Johnson et al. | Dec. 2, 1952 |
| 2,646,549 | Ragan et al. | July 21, 1953 |
| 2,656,515 | Hansen et al. | Oct. 20, 1953 |
| 2,752,572 | Bird et al. | June 26, 1956 |

FOREIGN PATENTS

| | | |
|---|---|---|
| 482,518 | Great Britain | Mar. 30, 1938 |
| 951,066 | France | Apr. 4, 1949 |
| 953,886 | France | May 30, 1949 |
| 695,166 | Great Britain | Aug. 5, 1953 |

OTHER REFERENCES

O.S.R.D. Report P.B. 14,272; 411–280, by Rhiger et al., Figures A 12–A 16 and pages 1–4. Published Oct. 25, 1945.

Book, "Very High Frequency Techniques," by Reich et al., Pub. by McGraw Hill Co., 1947, page 575 (vol. II) relied on.